United States Patent

Pan

[11] Patent Number: 6,009,007
[45] Date of Patent: Dec. 28, 1999

[54] PULSE-DENSITY-MODULATED CONTROLLER WITH DYNAMIC SEQUENCE

[75] Inventor: Tsung-Ming Pan, Ping Tung, Taiwan

[73] Assignee: Industrial Technology Research Institute, Hsinchu Hsien, Taiwan

[21] Appl. No.: 09/022,495

[22] Filed: Feb. 12, 1998

[51] Int. Cl.[6] .................................................. H02M 7/44
[52] U.S. Cl. ............................................................. 363/98
[58] Field of Search ............................. 363/17, 98, 132; 323/235, 238, 319, 321

[56] References Cited

U.S. PATENT DOCUMENTS

| | | | |
|---|---|---|---|
| 4,236,213 | 11/1980 | Richardson | 364/431 |
| 4,700,285 | 10/1987 | Szepsi | 363/97 |
| 5,329,439 | 7/1994 | Porojevic et al. | 363/87 |
| 5,442,540 | 8/1995 | Hua et al. | 363/98 |

OTHER PUBLICATIONS

"Pulse–Density–Modulated Power Control of a 4 kW, 450 kHz Voltage–Source Inverter for Induction Melting Applications", H. Fujita et al., IEEE Transactions on Industry Applications, vol. 32, No. 2, Mar./Apr. 1996.

*Primary Examiner*—Matthew Nguyen
*Attorney, Agent, or Firm*—McDermott, Will & Emery

[57] ABSTRACT

Apparatus for controlling pulse density is disclosed herein. The aforementioned apparatus including the following devices: A comparator that is used to compare an input reference voltage and a feedback voltage signal. A math processing device that is used to add the difference between the feedback voltage signal and an analog duty command signal to the analog duty command signal. A shift register that is used to generate a shift timing signal. A weighted averaging device that is used to carry out the operation of the weighted averaging of the feedback voltage signal according to the shift timing signal. A sequential switching device that is used to generate a switch-timing control signal by decoding the feedback voltage signal. A rectifying device that is used to output power with zero-current-switching. The rectifying means is driven by the switch-timing control signal.

5 Claims, 6 Drawing Sheets

PULSE-DENSITY-MODULATED CONTROLLER WITH DYNAMIC SEQUENCE

BACKGROUND OF THE INVENTION

1. Field of the Invention

This invention relates to a pulse-density-modulated controller, and particularly relates to a pulse-density-modulated controller suitable for various dynamic sequence.

2. Description of the Prior Art

In the traditional technique of switching mode power supply, the DC signal is approached by high frequency signals. The high frequency signals are rectified by a low pass filter, so the high frequency component of the signal is removed and the low frequency component of the signal is left. The frequency of the switching mode power supply is determined by the output voltage level. The traditional switching mode power supply utilizes PWM (Pulse Width Modulation) to generate a switching digital signal, then the switching digital signal is fed into the switch to enable the current switching mode power supply able to convert the current to the required power output. Whereas, the switching timing and the sequence of the PWM do not fit the proper switching time of the switch, the cross point of the current generated by the RLC resonant circuit is not the exact cross point of the current. Thus, the extra cross over distortion is presented. To overcome the switching losses, the improvement of the zero-cross-over is developed in the past few years. To minimize the current loss due to the cross over distortion during the switching of the switching power supply, the switching sequence must be generated by PDM modulator (Pulse Density Modulation). In determining the switching time and switching sequence, an A/D (analog-to-digital) converter and the switching sequence stored in the ROM (Read Only Memory) are utilized in the prior PDM modulator to enable the switching mode power supply to switch at zero voltage or zero current. Being processed by the PDM modulation, the control signal is fed to the switch, so the output current of the switching power supply can reach the required output power.

The PDM inverter repeats the alternating run and stop to adjust the average output power. "Pulse-Density-Modulated Power Control of a 4 kW, 450 kHz Voltage-Source Inverter for Induction Melting Applications" by Hideaki Fujita, et al. IEEE TRANSACTION ON INDUSTRY APPLICATIONS. VOL. 32. NO. 2. MARCH/APRIL 1996, discloses three switching modes in the PDM. The simplified circuit of the switching mode in the PDM is shown in FIG. 1A, the three switching modes are shown in FIG. 1B, FIG. 1C and FIG. 1D. Conventional frequency controlled inverters have only two switching modes such as modes I and II shown in FIG. 1B and FIG. 1C respectively. In addition, the PDM inverter proposes a mode III that the resonant current continuously flowing through a low side MOSFET in one leg and a low side diode in the other leg, which is shown in FIG. 1D, and the output voltage of the PDM inverter is equal to zero. Thus, the mode III is utilized in the PDM inverter and the Phase-Shift inverter.

FIG. 2 shows a switching pattern of the PDM. The inverter acts as a square wave voltage source with the amplitude of Vd for three resonant cycles, while it acts as a zero voltage source for only one cycle. If the attention is paid to four resonant cycles, the output voltage of the inverter is in a periodic waveform, where the average output voltage is ¾, compared with the full power operation. Thus, the output power of the inverter can be controlled by adjusting the pulse density of the square wave voltage. The PDM can reduce the switching losses greatly because all the MOSFETs are always turned on and off at zero current. To analyze the output power of the resonant circuit, it is proportional to the density of the pulses generated by the PDM modulator.

FIG. 3 shows a control circuit of the pulse-density-modulated modulator. The control circuit forms a type of phase-locked loop, which outputs the gate pulses in phase with the resonant current. The amplitude of the resonant current is too small to detect the phase at the time of the zero crossing of the source voltage with the line frequency of 60 Hz because there is no smoothing capacitor connected to the dc link. Thus, the cut-off frequency of the low pass filter is set to be 1.5 ms (0.0015 seconds) to eliminate the change of the frequency of the voltage-controlled oscillator at the zero-crossing. The output of the voltage-controlled oscillator is a pulse train, and the frequency of which is twice as high as the operating frequency of the inverter. The pulse train is applied to the five-bit set-up counter and then a desired PDM pattern is selected out of the 16 patterns, which are stored in a ROM.

FIG. 4 shows the 16 PDM patterns used in the experimental system as a parameter of the pulse density of TA/T from $1/16$ to $16/16$. The period of time of each PDM pattern stored in the ROM is equal to sixteen times of the resonant period. The PDM patterns are determined so as to reduce the amplitude's fluctuation of the resonant current, which is caused by the PDM. As a result, an actual period of time depends on the PDM pattern, which is chosen by a pattern select signal. The PDM pattern signals A and B are applied to four blanking time circuits to produce four gate drive signals. Thus, the operating frequency of the pulse-density-modulated controller is equal to the actual switching frequency. On the other hand, the operating frequency of the pulse-density-modulated controller is equal to the resonant frequency in the PDM modulator. This means that the PDM modulator gets zero-current switching (ZCS) in all operating conditions.

The PDM modulator would make a great contribution to reduce the switching losses, and to achieve high reliability. The PDM modulator is capable of adjusting the output power by itself, and performing both ZVS and ZCS in all the operating conditions, so the volume is thus shrunk. Whereas, the dynamic response is limited due to the fixed timing sequence stored in the ROM (Read Only Memory). Furthermore, the high speed A/D (Analog to Digital) converter always limits the dynamic response.

SUMMARY OF THE INVENTION

This invention relates to a pulse-density-modulated controller suitable for dynamic sequence. Because the output signal of the conventional pulse-density-modulated controller used in the switching mode power supply is not zero-current-switching, thus the loss of output power of the switching mode power supply can not be reduced. To reach ZVS (Zero-Voltage-Switching) or ZCS (Zero-Current-Switching) the traditional pulse-density-modulated controller must use the high frequency A/D converter and change the design of ROM (Read Only Memory), which the sequence patterns are stored in the ROM. To overcome the disadvantage mentioned above, the present invention utilize a PDM controller that is coupled to a switch sequencer, so that the output voltage of the switching mode power supply can performing both ZVS and ZCS in all the operating conditions.

The present invention offers apparatus for controlling pulse density. The aforementioned apparatus include the following devices: A comparator that is used to compare an input reference voltage and a feedback voltage signal. A math processing device that is used to add the difference between the feedback voltage signal and an analog duty command signal to the analog duty command signal.

A shift register that is used to generate a shift timing signal. A weighted averaging device that is used to carry out the operation of the weighted averaging of the feedback voltage signal according to the shift timing signal. Also, a sequential switching device is used to generate a switch-timing control signal by decoding the feedback voltage signal. A rectifying device that is used to output the power with the zero-current-switching and the rectifying means is driven by the switch-timing control signal.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1A:
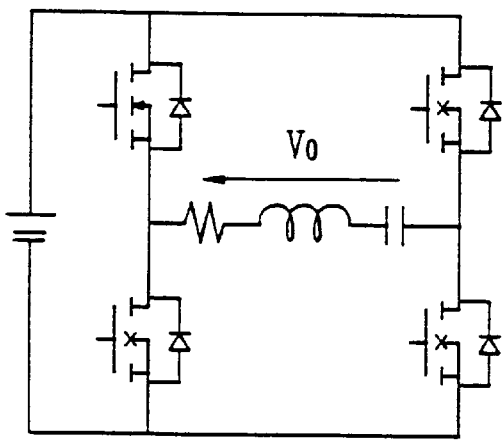
FIG. 1A shows the simplified circuit of the switching mode in the PDM controller.
Figure 1B:
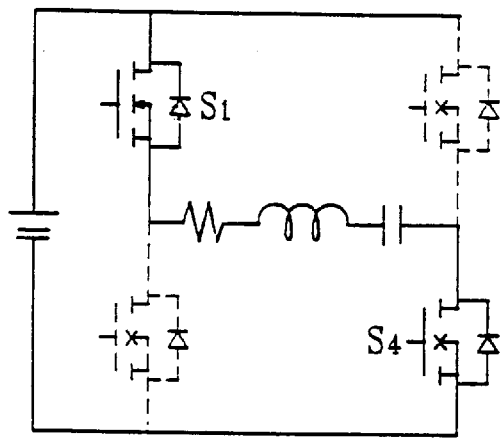
FIG. 1B shows mode I of the switching mode in the PDM controller.
Figure 1C:
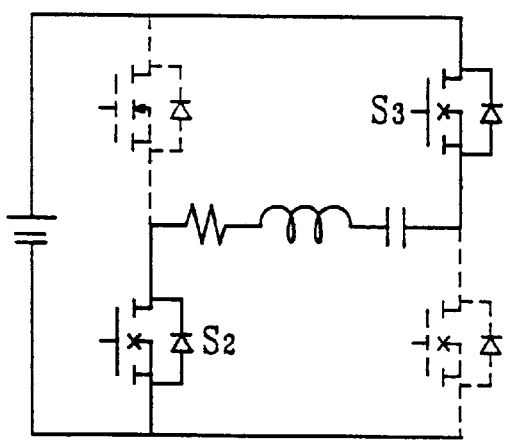
FIG. 1C shows mode II of the switching mode in the PDM controller.
Figure 1D:
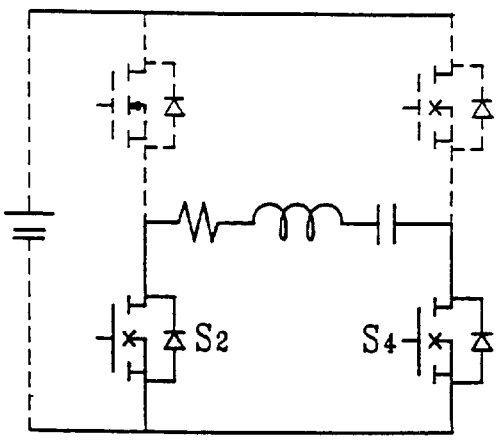
FIG. 1D shows mode III of the switching mode in the PDM controller.
Figure 2:
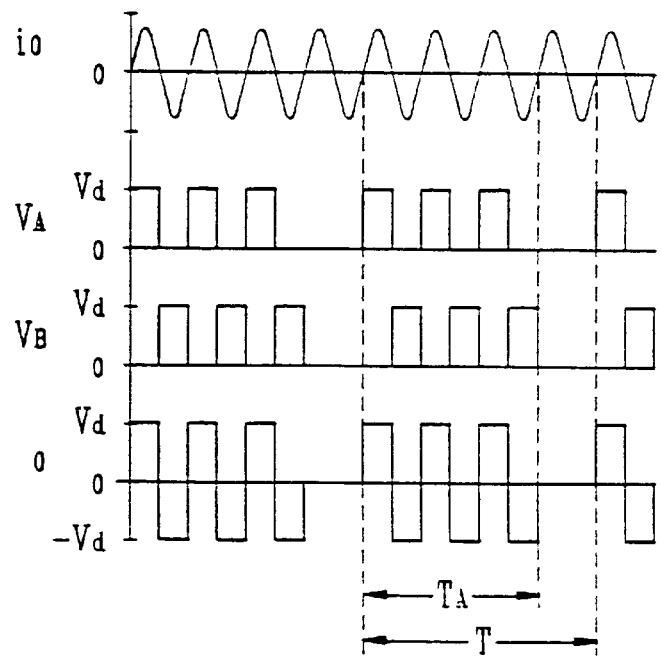
FIG. 2 shows the switching pattern used in the PDM (Pulse Density Modulation) controller.
Figure 3:
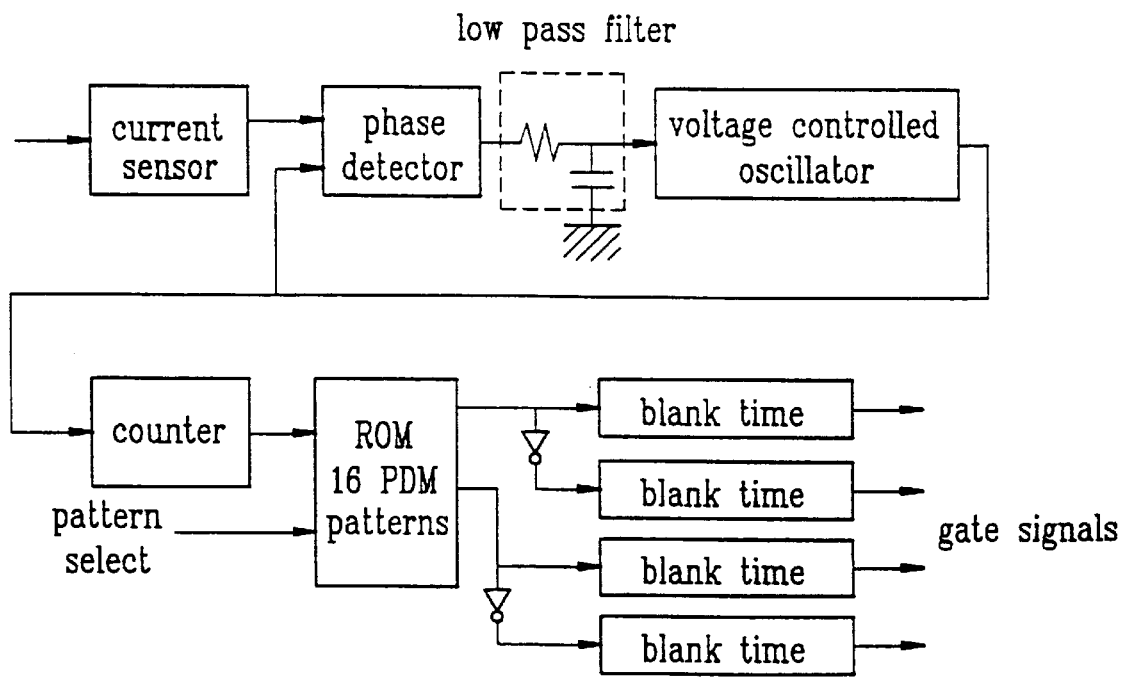
FIG. 3 shows the configuration of the control circuit.
Figure 4:
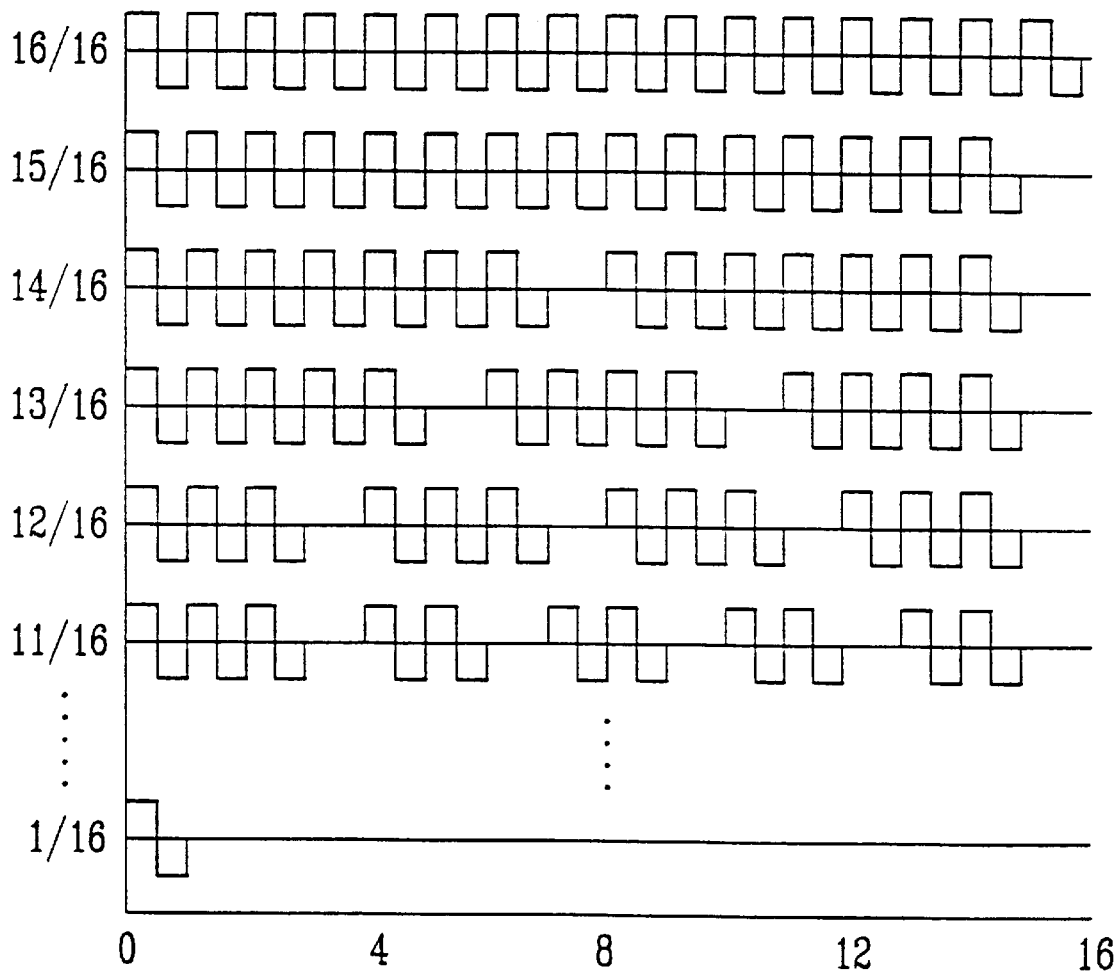
FIG. 4 is the PDM patterns stored in the ROM (Read Only Memory) that is used in the prior switching mode power supply.
Figure 5:
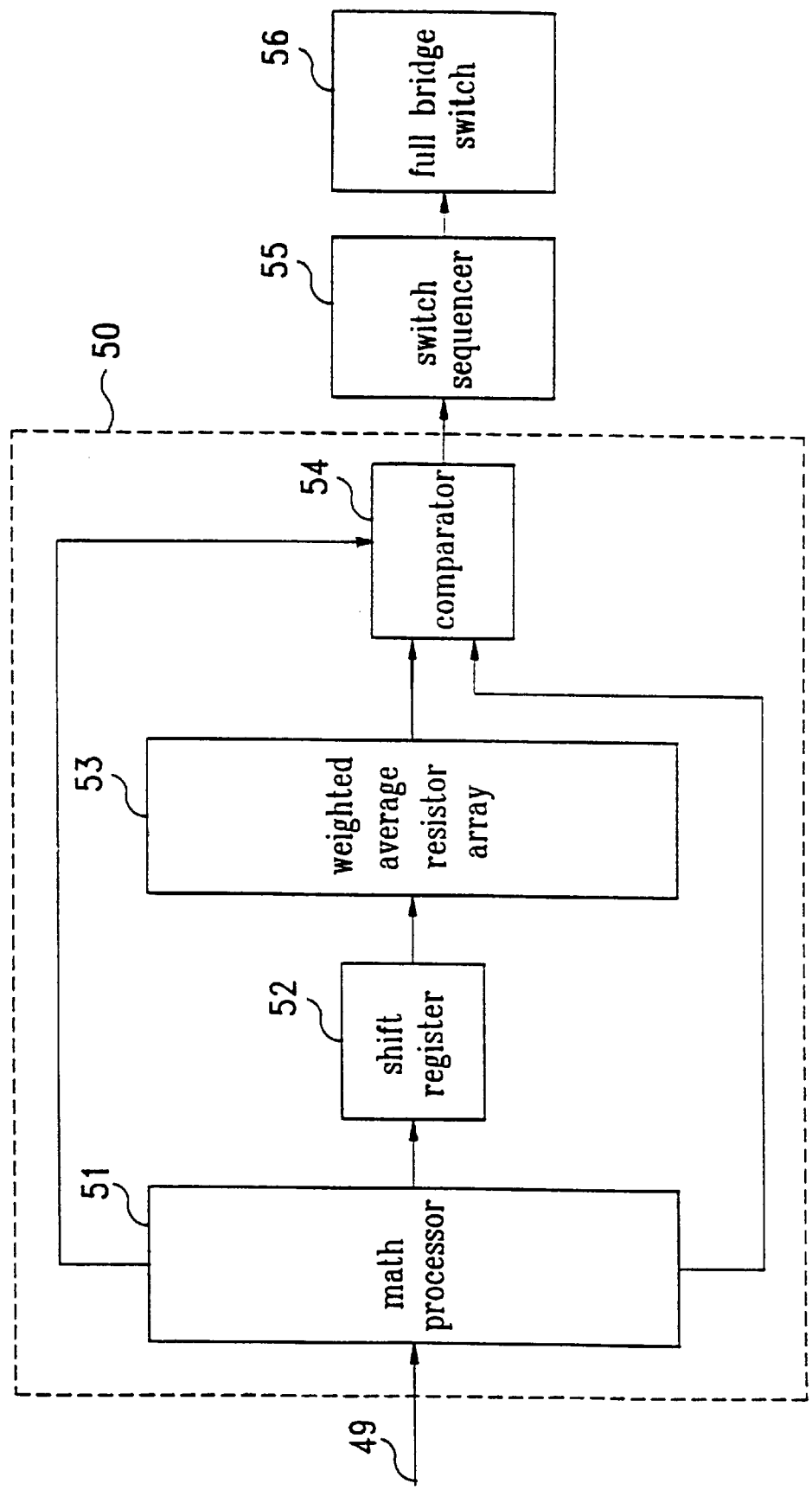
FIG. 5 shows the functional block diagram of the switching mode power supply by using the pulse-density-modulated controller with the dynamic sequence according to the present invention.

To avoid the aforementioned disadvantages, the present invention provides the pulse-density-modulated controller with dynamic sequence. The block diagram of the pulse-density-modulated controller with dynamic sequence is shown in FIG. 5. The math processor 51 processes the analog duty command signal on the analog setup point 49 and the output signal of the comparator 54, and then feeds the result to the shift register 52. The output of the shift register 52 is a sixteen bit signal, which is fed to the weighted average resistor array 53 formed by an R-2R network. The weighted average resistor array 53 processes the output signal of the shift register 52 by the weighted average, and then feeds the result to the comparator 54. The aforementioned R-2R network is the structure of the circuit of the widely used A/D (analog to digital)converter. The output signal of the comparator 54 is driven by the 16 bit digital signal in the comparator 54, and the output signal of the comparator 54 is fed to the switch sequencer 55. The output signal of the comparator 54 is a feedback voltage signal in the preferred embodiment according to the present invention. The output signal of the switch sequencer 55 is a four bit switching sequence, which is sent to the full bridge switch 56. Thus, the zero-current-switching and the zero-voltage-switching are achieved, and the switching loss is largely reduced.

The math processor 51 is the combination of an adder and an A/D converter. The PDM modulator 50 including math processor 51, shift register 52, weighted average resistor array 53 and comparator 54 is actually an encoder. The switching sequencer 55 is a decoder, which combined with the aforementioned encoder is a PDM controller. The output signal of the PDM controller is a switching sequence signal, which is a signal of zero-current-switching, and the efficiency of the output power of the full bridge switch 56 is thus increased.

Figure 6:
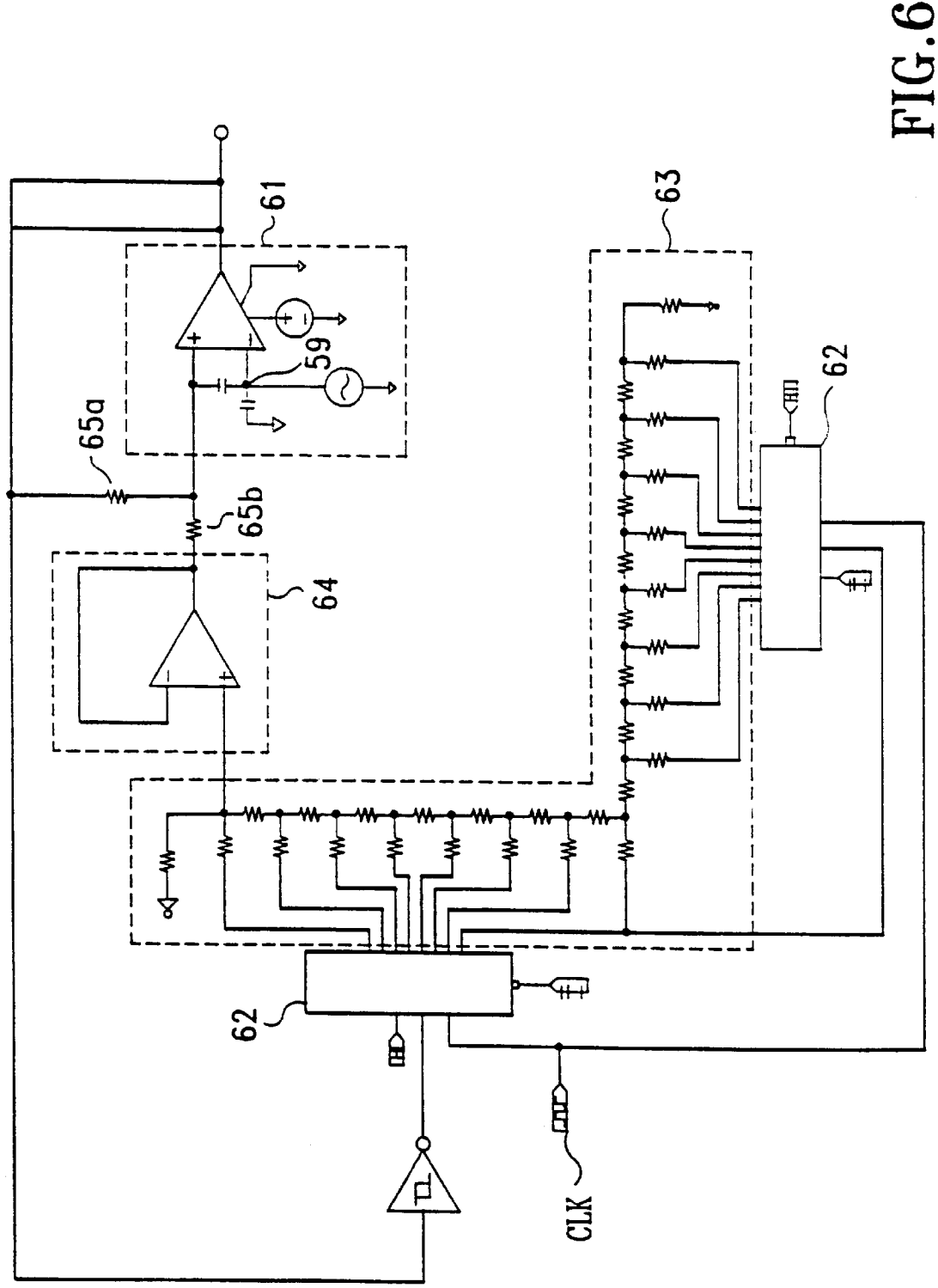
FIG. 6 shows the circuit diagram of the pulse-density-modulated controller suitable for various dynamic sequence according to the present invention.

The circuit diagram of the pulse-density-modulated controller with dynamic sequence is shown in FIG. 6. The analog voltage input signal on the setup parameter point 59 of one terminal ( negative input terminal) is fed to the comparator 61 as a reference input. The voltage signal on the other terminal (positive input terminal) of the comparator 61 is compared with the voltage on the setup parameter point 59, and the result is fed to the shift register 62. In addition, the pulse train of frequency 1.6 MHz generated by the clock CLK is fed to the shift register 62, then the 16 bit shift timing signal is generated by the shift register 62. Then, the 16 bit shift timing signal is fed into the R-2R network 63, so the weighted average signal is generated and sent to the math processor formed of resistor 65a and 65b via buffer 64. The math processor mentioned above is an adder including the resisters 65a and 65b. The function of the math processor is to add the difference between the feedback voltage signal and the analog duty command signal to the analog duty command signal. The output signal of the adder is sent to the positive input terminal of the comparator 61 to compare the voltage on the positive input terminal with the negative input terminal. The 16 bit digital signal in the shift register 62 drives the digital pulse train signal, i.e., the output signal of the comparator 61, to the switching sequencer, which is shown as switching sequencer 55 in FIG. 5. The output signal—"switching sequence signal" of the switching sequencer is generated according to various voltage level on the reference input, thus, the dynamic sequence used in the pulse-density-modulated controller is generated. The pulse-density-modulated controller with dynamic sequence can be viewed as a PDM encoder, and the switch sequencer is a decoder. The present invention provides a pulse-density-modulated controller with dynamic sequence that is able to generate various controlling signal used in the full bridge switch according to various input voltage level on the reference input. Whereas, an A/D converter and a PDM pattern stored in the ROM (Read Only Memory) is necessary in the prior art, and one of the PDM pattern is selected by a pattern selecting signal to activate the controller in the prior art.

For the aforementioned statements, it is clear that the switching timing of the switching mode power supply is determined by the switching sequencer. Due to the zero-current-switching and the zero-voltage-switching of the full bridge switch, the efficiency of the switching mode power supply is largely increased. Besides, the EMI (ElectroMagnetic Interference) during the switching operation of the switching mode power supply is reduced due to the operation of the switching. The aim of the pulse-density-modulated controller in the present invention is to spare the A/D converter and the patterns stored in the ROM. In addition, the signal passing the switch sequencer coupled with the full bridge switch has zero-current-switching and zero-voltage-switching, thus the power loss of the switching mode power supply is reduced. Furthermore, because the operation of the full bridge switch is determined by the voltage level on the reference input of the comparator of the pulse-density-modulated controller, the dynamic response of the switching mode power supply is largely improved without design a ROM with different patterns. The full bridge switch is actually a bridge rectifier.

Figure 7:
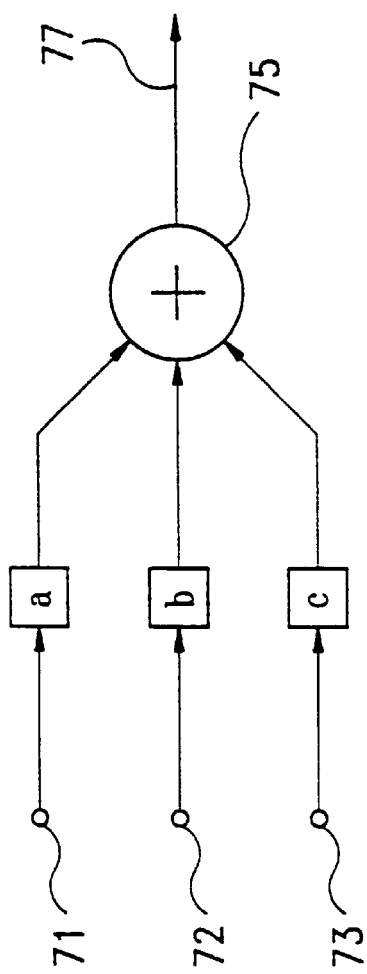
FIG. 7 illustrate the principle of operation of weighted-average performed by the weighted-average resistor array.
Figure 8:
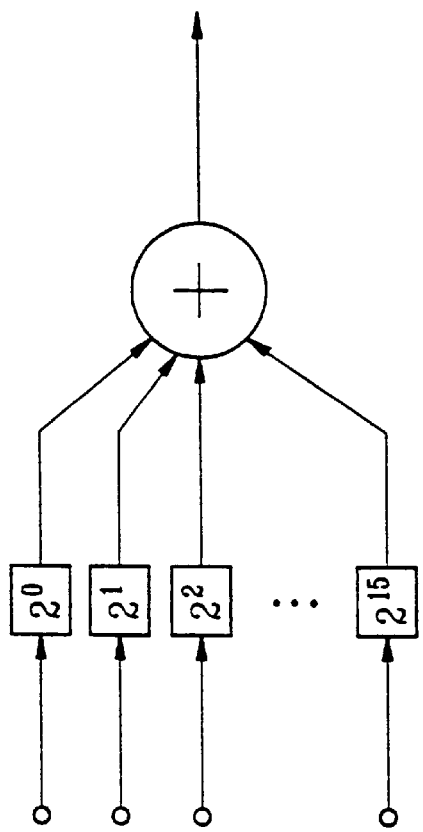
FIG. 8 illustrate the circuit executing the operation of weighted-average performed by the weighted-average resistor array of the preferred embodiment in present invention.

The circuit executing the operation of weighted-average of the performed by the weighted-average resistor array 53 (FIG. 5) is illustrated and symbolized in FIG. 7. The aim of the weighted-average operation is to generate an analog signal according to a digital input signal. If the input digit is (1,0,0) and is fed to the terminals 71, 72 and 73 respectively. The weighted number of the terminals 71, 72 and 73 are a, b and c respectively. And the device 75 is an adder. When the source voltage is 5 volt, the output voltage on the output terminal 77 is equal to 5·(1·a+0·b+0·c). The weighted number of the R-2R network used in the preferred embodiment is illustrated in FIG. 8. In which the number of input terminals are sixteen.

Although specific embodiments have been illustrated and described, it will be obvious to those skilled in the art that various modification may be made without departing from the spirit which is intended to be limited solely by the appended claims.

What is claimed is:

1. Apparatus for controlling pulse density, said apparatus comprising:
    a comparator for comparing an input reference voltage and a feedback voltage signal, said feedback signal being encoded;
    math processing means for adding the difference between said feedback signal and an analog duty command signal to said analog duty command signal;
    a shift register for generating a shift timing signal;
    weighted averaging means for weighted averaging said feedback signal according to said shift timing signal;
    sequential switching means for generating a switch-timing control signal by decoding said feedback voltage signal; and
    rectifying means for outputting power with zero-current-switching, said rectifying means being driven by said switch-timing control signal.

2. The apparatus as claim 1, wherein said weighted averaging means averaging a sixteen bit digital pulse sequence.

3. The apparatus as claim 1, wherein said sequential switching means is a decoding circuit, said decoding circuit generates said switch-timing control signal by decoding said sixteen bit digital pulse train signal, said switch-timing control signal is a four bit digital signal.

4. The apparatus as claim 1, wherein said math processor is an adder, said adder comprises a buffer and two resistors.

5. The apparatus as claim 1, wherein said weighted averaging means is an R-2R network, said R-2R network comprises a plurality of resistors.

* * * * *